(12) United States Patent
Saoud et al.

(10) Patent No.: US 7,509,961 B2
(45) Date of Patent: Mar. 31, 2009

(54) CIGARETTES AND CIGARETTE COMPONENTS CONTAINING NANOSTRUCTURED FIBRIL MATERIALS

(75) Inventors: Khaled Saoud, Richmond, VA (US);
Firooz Rasouli, Midlothian, VA (US);
Shahryar Rabiei, Richmond, VA (US);
Shalva Gedevanishvili, Richmond, VA (US); Mohammad R. Hajaligol, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 760 days.

(21) Appl. No.: 10/972,203

(22) Filed: Oct. 25, 2004

(65) Prior Publication Data

US 2005/0121047 A1   Jun. 9, 2005
US 2006/0174903 A9   Aug. 10, 2006

Related U.S. Application Data

(60) Provisional application No. 60/514,526, filed on Oct. 27, 2003.

(51) Int. Cl.
*A24B 15/22* (2006.01)
*A24C 1/00* (2006.01)

(52) U.S. Cl. .................. 131/284; 131/364; 162/192; 205/80; 977/890

(58) Field of Classification Search ................ 977/857, 977/890; 205/80; 162/50, 192; 131/284, 131/364
See application file for complete search history.

(56) References Cited

U.S. PATENT DOCUMENTS 3,720,214 A   3/1973   Norman et al.
3,807,416 A   4/1974   Hedge et al.
3,931,824 A   1/1976   Miano et al.
4,109,663 A   8/1978   Maeda et al.
4,119,104 A  10/1978   Roth
4,193,412 A   3/1980   Heim et al.
4,195,645 A   4/1980   Bradley, Jr. et al.
4,197,861 A   4/1980   Keith (Continued)

FOREIGN PATENT DOCUMENTS

CH           609217 A5      2/1979

(Continued)

OTHER PUBLICATIONS

Mattox, Donald M., Handbook of Physical Vapor Depostion Processing, 1998, Noyes Publications.*

(Continued)

*Primary Examiner*—Steven P Griffin
*Assistant Examiner*—Cynthia Szewczyk
(74) *Attorney, Agent, or Firm*—Buchanan Ingersoll & Rooney PC (57) ABSTRACT

Cigarettes and cigarette components such as tobacco cut filler and cigarette paper, and methods for making cigarette components are provided that comprise nanostructured fibrils. The nanostructured fibrils, which can be formed and deposited in situ on tobacco cut filler and/or cigarette paper by laser vaporization controlled condensation or chemical reaction, are capable of acting as an oxidant for the conversion of carbon monoxide carbon dioxide and/or as a catalyst for the conversion of carbon monoxide to carbon dioxide. Cigarettes are provided that comprise tobacco cut filler and cigarette paper, wherein nanostructured fibrils are deposited on, or incorporated in, at least one of the tobacco cut filler and cigarette paper.

24 Claims, 3 Drawing Sheets

U.S. PATENT DOCUMENTS

| | | |
|---|---|---|
| 4,317,460 A | 3/1982 | Dale et al. |
| RE31,700 E | 10/1984 | Yamaguchi |
| 4,956,330 A | 9/1990 | Elliott et al. |
| 5,050,621 A | 9/1991 | Creighton et al. |
| 5,101,839 A | 4/1992 | Jakob et al. |
| 5,105,836 A | 4/1992 | Gentry et al. |
| 5,129,408 A | 7/1992 | Jakob et al. |
| 5,258,330 A | 11/1993 | Khandros et al. |
| 5,258,340 A | 11/1993 | Augustine et al. |
| 5,322,075 A | 6/1994 | Deevi et al. |
| 5,591,368 A | 1/1997 | Fleischhauer et al. |
| 5,598,868 A | 2/1997 | Jakob et al. |
| 5,626,650 A | 5/1997 | Rodriguez et al. |
| 5,800,878 A * | 9/1998 | Yao ........................... 427/573 |
| 5,897,945 A * | 4/1999 | Lieber et al. ................. 428/323 |
| 5,934,289 A | 8/1999 | Watkins et al. |
| 6,033,532 A * | 3/2000 | Minami ................. 204/192.11 |
| 6,053,176 A | 4/2000 | Adams et al. |
| 6,095,152 A | 8/2000 | Beven et al. |
| 6,099,960 A | 8/2000 | Tennent et al. |
| 6,162,530 A | 12/2000 | Xiao et al. |
| 6,308,509 B1 | 10/2001 | Scardino et al. |
| 6,346,303 B1 | 2/2002 | Shih et al. |
| 6,382,526 B1 | 5/2002 | Reneker et al. |
| 6,419,717 B2 | 7/2002 | Moy et al. |
| 6,440,562 B1 | 8/2002 | Tamou et al. |
| 6,445,006 B1 | 9/2002 | Brandes et al. |
| 6,497,029 B1 | 12/2002 | Quick et al. |
| 6,517,802 B1 | 2/2003 | Xiao et al. |
| 6,520,425 B1 | 2/2003 | Reneker |
| 6,537,515 B1 | 3/2003 | Baker et al. |
| 6,586,093 B1 | 7/2003 | Laude et al. |
| 2003/0075193 A1 | 4/2003 | Li et al. |

FOREIGN PATENT DOCUMENTS

| | | |
|---|---|---|
| GB | 685822 A | 1/1953 |
| GB | 863287 A | 3/1961 |
| GB | 973854 A | 10/1964 |
| GB | 1104993 A | 3/1968 |
| GB | 1315374 A | 5/1973 |
| WO | WO 87/06104 | 10/1987 |
| WO | WO 00/40104 | 7/2000 |
| WO | WO 03/053177 A | 7/2003 |

OTHER PUBLICATIONS

El-Shall, M. Samy, "Vapor Phase Growth and Assembly of Metallic, Intermetallic, Carbon, and Silicon Nanoparticle Filaments." *J. Phys. Chem.. B.* 2003, 107, American Chemical Society, pp. 2882-2886.

International Search Report for PCT/IB2004/003653 dated Mar. 11, 2005.

Written Opinion of the International Searching Authority for PCT/IB2004/003653 dated Mar. 11, 2005.

International Preliminary Report on Patentability for PCT/IB2004/003653 dated May 1, 2006.

\* cited by examiner

CIGARETTES AND CIGARETTE COMPONENTS CONTAINING NANOSTRUCTURED FIBRIL MATERIALS

This application claims priority under 35 U.S.C. §119 to U.S. Provisional Application No. 60/514,526 entitled CIGARETTES AND CIGARETTE COMPONENTS CONTAINING NANOSTRUCTURED FIBRIL MATERIALS, filed Oct. 27, 2003, the entire content of which is hereby incorporated by reference.

BACKGROUND

Various methods for reducing the amount of carbon monoxide in the mainstream smoke of a cigarette during smoking have been proposed.

Despite the developments to date, there remains an interest in improved and more efficient methods and compositions for reducing the amount of carbon monoxide in the mainstream smoke of a cigarette during smoking.

SUMMARY

Nanostructured fibrils can be formed and deposited directly on cigarette components such as tobacco cut filler and cigarette paper. According to an embodiment, the nanostructured fibrils can be formed and deposited in situ directly on tobacco cut filler and/or cigarette paper using laser vaporization controlled condensation (LVCC). According to a further embodiment, the nanostructured fibrils can be formed (e.g., by LVCC or other suitable techniques) and then deposited on and/or incorporated in a component of a cigarette such as tobacco cut filler and/or cigarette paper.

The nanostructured fibrils can be formed by laser vaporization controlled condensation. The method comprises supporting a substrate in a chamber having a target and first and second electrodes; applying an electrical bias between the electrodes to form electrical field lines between the electrodes; and bombarding the target with a high energy source to form nanoscale particles from the target material that agglomerate with each other along the direction of the electrical field lines to form nanostructured fibrils on the substrate. The substrate can comprise tobacco cut filler and/or cigarette paper, or the substrate can comprise the first or second electrode.

The first and second electrodes, which are preferably plates arranged parallel to one another, can be maintained at a temperature during the bombardment of from about −196° C. to 100° C. Furthermore, a temperature gradient between the plates of greater than about 100° C. can be maintained during the bombardment. The first plate, on which the fibrils can be deposited, can be located at a distance of from about 2 to 20 cm from the target. An electrical bias of less than about 100 V/cm, e.g., about 10, 20, 30, 40, 50, 60, 70, 80 or 90 V/cm is preferably applied between the first and second plates.

According to a preferred embodiment, the chamber comprises a vacuum chamber such as a diffusion cloud chamber. Laser bombardment of the target can be carried out in an inert atmosphere or an atmosphere comprising a reactive gas. For example, bombardment of the target can be performed in an atmosphere comprising an oxygen-containing gas. Preferred oxygen-containing gases include air, oxygen and water vapor. Bombardment of the target can be carried out at a chamber pressure of greater than about $1\times10^{-4}$ Torr, preferably at about atmospheric pressure.

According to a preferred embodiment the target comprises manganese, iron and/or copper and can be bombarded with a Nd-YAG laser, ion laser, diode array laser or pulsed excimer laser to form nanostructured fibrils that comprise manganese, iron and/or copper (e.g., nanostructured fibrils that comprise manganese, iron and/or copper metal, and/or compounds such as oxides or oxyhydroxides of manganese, iron and/or copper).

The nanostructured fibrils can have a dimension (e.g., width or diameter) of less than about 500 nm, more preferably less than about 100 nm, most preferably less than about 50 nm. The nanostructured fibrils can have an aspect ratio of length to width of greater than about 10:1, e.g., greater than about 1,000:1 or greater than about 1,000,000:1. The fibrils preferably comprise thread-like fibers or filaments.

The nanostructured fibrils, which can have a crystalline or amorphous structure, preferably comprise a metal compound such as a metal oxide, metal oxyhydroxide or mixed metal oxide such as manganese oxide, iron oxide, copper oxide or mixtures thereof. Mixtures of nanostructured fibrils having different compositions as well as alloyed nanostructured fibrils can be formed by simultaneous or sequential evaporation of several different targets and/or targets comprising more than one metallic element.

According to a preferred embodiment, a cigarette can be formed by depositing nanostructured fibrils on tobacco cut filler and/or cigarette paper, providing the tobacco cut filler to a cigarette making machine to form a tobacco column; and placing the cigarette paper around the tobacco column to form a tobacco rod of a cigarette. The nanostructured fibrils can be deposited on tobacco cut filler to give preferably less than about 10% by weight of nanostructured fibrils on the tobacco cut filler. As mentioned above, the nanostructured fibrils can be formed directly on the tobacco cut filler or cigarette paper, or previously formed nanostructured fibrils can be deposited on and/or incorporated in the tobacco cut filler or cigarette paper. For example, the nanostructured fibrils can be formed and then deposited on the tobacco cut filler or cigarette paper by dusting.

According to a further embodiment, nanostructured fibrils can be formed directly on a component of a cigarette by forming a metal oxide from a solution comprising a metal salt and sodium hydroxide; drying the metal oxide; and combining the metal oxide with the cigarette component, wherein the metal oxide reacts with moisture in the cigarette component to form nanostructured fibrils.

The nanostructured fibrils are capable of acting as an oxidant for the conversion of carbon monoxide to carbon dioxide and/or as a catalyst for the conversion of carbon monoxide to carbon dioxide. The nanostructured fibrils can be incorporated into a cigarette in an amount effective to reduce the ratio in mainstream tobacco smoke of carbon monoxide to total particulate matter by at least 10%, e.g., at least 25%.

Further embodiments provide cigarettes comprising nanostructured fibrils, wherein the cigarettes comprise tobacco cut filler and cigarette paper and the nanostructured fibrils are deposited on or incorporated in at least one of the tobacco cut filler and cigarette paper.

DETAILED DESCRIPTION OF PREFERRED EMBODIMENTS

Provided are cigarettes and cigarette components such as tobacco cut filler and cigarette paper that comprise nanostructured fibrils useful for reducing CO in cigarette smoke. According to a preferred method, the nanostructured fibrils can be formed and deposited in situ directly on a cigarette component using laser vaporization controlled condensation (LVCC). The method comprises supporting a target and a substrate in a chamber having first and second electrodes; applying an electrical bias to the first electrode with respect to the second electrode to form electrical field lines between the electrodes; and bombarding the target with a high energy source to form nanoscale particles from the target material that agglomerate along the direction of the electrical field lines to form nanostructured fibrils on the substrate. According to a further embodiment, the nanostructured fibrils can be formed by LVCC and later deposited on and/or incorporated in one or more components of a cigarette. According to yet a further preferred method, nanostructured fibrils can be formed by precipitating a metal salt under basic conditions to produce a metal oxide, which is then converted to nanostructured oxide or oxyhydroxide fibrils upon exposure to warm, moist air.

A further embodiment relates to a method of making a cigarette, comprising depositing nanostructured fibrils on at least one of tobacco cut filler and cigarette paper; providing the tobacco cut filler to a cigarette making machine to form a tobacco column; and placing the cigarette paper around the tobacco column to form a tobacco rod of a cigarette.

The nanostructured fibrils, which are capable of acting as an oxidant for the conversion of carbon monoxide to carbon dioxide and/or as a catalyst for the conversion of carbon monoxide to carbon dioxide, can reduce the amount of carbon monoxide in mainstream smoke during smoking. Because of their two-dimensional shape (e.g., fibrous shape), the nanostructured fibrils can exhibit better adhesion to tobacco cut filler and/or cigarette paper than free flowing one-dimensional nanoscale particles.

With laser vaporization controlled condensation, material from a source (i.e., target) is removed from the target by physical erosion and deposited on a surface of a substrate. The target is formed of (or coated with) a consumable material to be removed and deposited, i.e., target material.

Laser vaporization controlled condensation is preferably implemented by impinging the surface of a target with a high energy source such as a laser beam in a controlled pressure gas atmosphere. Energy from the laser beam, which is preferably rastered across the surface of the target, can cause sputtering of the target material (i.e., charged and neutral species of target material can be ejected from target). The growth of nanostructured fibrils of intermetallic compounds such as FeAl, $Ti_3Al$, NiAl and CuZn using LVCC is disclosed by El-Shall et al. in *J. Phys. Chem. B* 2003, 107, 2882-2886.

If the density of the ejected species is sufficiently low, and their relative velocities sufficiently high, charged and neutral species from the target travel through the gas until they impact the surface of a substrate where they can coalesce into nanoscale particles that form nanostructured fibrils under the force of the applied electric field. If the density of the ejected species is sufficiently high, and their relative velocities sufficiently small, species ejected from the target can aggregate in the gas phase into nanoscale particles that form nanostructured fibrils in the gas phase under the force of the applied electric field, which can then deposit on a substrate. Fibril growth is caused by particle assembly initiating at one of the chamber electrodes and extending under the influence of the applied field towards the opposite electrode.

Without wishing to be bound by theory, at a chamber pressure lower than about $10^{-4}$ Torr the mean free path of ablated species is sufficiently long that ablated species arrive at the substrate without undergoing significant gas phase collisions. Thus, at lower pressures, ablated material can deposit on the substrate as individual species, which may diffuse and coalesce with each other to form nanoscale fibrils after alighting on the substrate surface. At a higher pressures, such as pressures above about $10^{-4}$ Torr, the collision frequency in the gas phase of ablated species is significantly higher and nucleation and growth of the ablated species to form nanostructured fibrils can occur in the gas phase before alighting on the substrate surface. Thus, at higher pressures, ablated material can form nanoscale particles in the gas phase, which can agglomerate to form nanostructured fibrils under the force of an applied electric field.

Both charged and neutral species that are ejected from a target can experience electrophoretic forces under an applied electric field. For example, in a non-uniform electric field, neutral species can exhibit a translational motion known as dielectrophoresis. Thus, nanostructured fibrils can be assembled from both neutral and charged species under the force of an applied electric field. Depending on parameters such as the chamber pressure, the temperature and voltage gradients between the electrodes, laser energy and choice of target material, nanostructured fibrils can be formed from particles in the gas phase and/or from particles that have alighted on the surface of a substrate.

Figure 1:
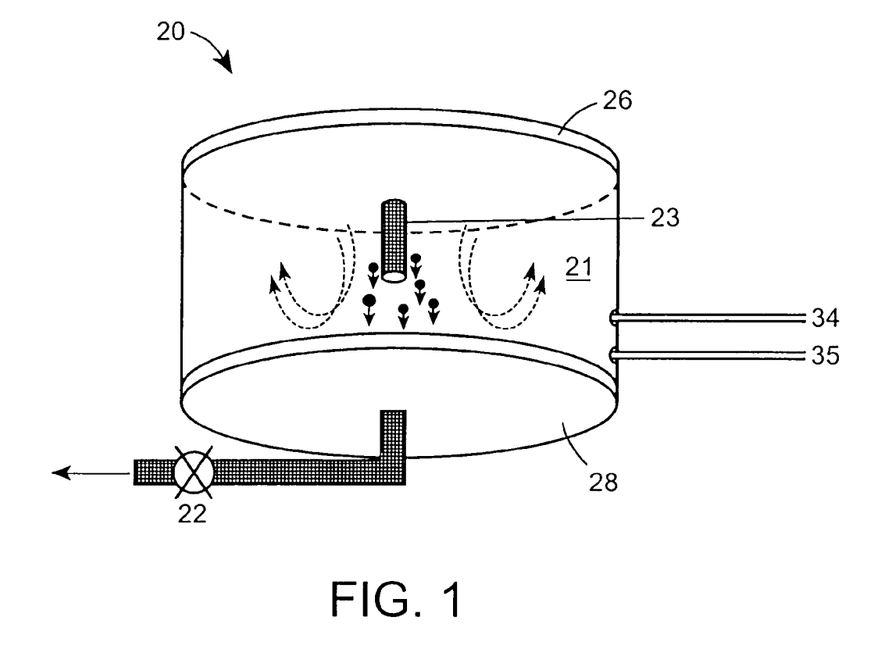
FIG. 1 is an illustration of an experimental set up for the formation of nanostructured fibrils by the LVCC method.

A method of depositing nanostructured fibrils via laser vaporization controlled condensation is provided in conjunction with the exemplary apparatus depicted in FIG. 1. Apparatus 20 includes a diffusion cloud chamber 21 having an optional throttle valve 22 that separates the chamber 21 from an optional vacuum pump (not shown). A target 23, such as a pressed powder target of iron oxide, is mounted on an upper electrode plate 26 of the chamber 21. Lower electrode plate 28 can function as a substrate for the deposition of nanostructured fibrils or, alternatively, an optional substrate material such as tobacco cut filler or cigarette paper, can be positioned on the lower electrode plate 28. Upper and lower electrode plates, which can be separated by an insulating ring such as a quartz ring, can be formed of a conductive material, such as stainless steel. The quartz ring can have a height of from about 2 to 20 cm, preferably about 5 cm.

During the formation of nanostructured fibrils, the upper electrode plate 26 is preferably maintained at a temperature greater than the temperature of the lower electrode plate 28. For example, the upper electrode plate can be maintained at a temperature of from about 20 to 100° C., and the lower electrode plate can be maintained at a temperature of from about −196 to 30° C. The temperature gradient between the top and bottom electrode plates results in a steady convection current, which can be enhanced by increasing the chamber pressure (e.g., to pressures greater than about $10^3$ torr). The temperature gradient can be maintained between the upper and lower electrode plates during the deposition by flowing a cooling liquid such as chilled water or liquid nitrogen through lower electrode plate and/or flowing a heating liquid such as hot oil through the upper electrode plate.

Referring still to FIG. 1, the reactor chamber 21 contains conduits 34 and 35 for introducing various gases. For example, helium could be introduced through conduit 34 and, optionally, oxygen through conduit 35. Gases are introduced into the chamber by first passing them through separate flow controllers to provide a total pressure of gasses in the chamber of greater than about $10^{-4}$ Torr, preferably about 1 to $10^3$ Torr.

Nanostructured fibrils may be formed and deposited on a substrate using an ablation process, wherein a suitable high energy source such as a laser is aimed at a target under conditions sufficient to release (i.e., ablate) individual particles from the target. Lasers include, but are not limited to, Nd-YAG lasers, ion lasers, diode array lasers and pulsed excimer lasers. For example, nanostructured fibrils can be generated by pulsed laser vaporization using the second harmonic (532 nm) of a Nd:YAG laser (e.g., about 50-70 mJ/pulse, 10 nanosecond pulse).

Advantageously, ablation such as laser ablation can be performed at or above atmospheric pressure without the need for vacuum equipment. Thus, the nanostructured fibrils may be simultaneously formed and deposited on a substrate that is maintained at or near ambient temperature and atmospheric pressure during the deposition process.

An apparatus for ablative processing includes a chamber in which a target material is placed. An external energy source, such as a pulsed excimer laser, enters the chamber through a window, preferably quartz, and interacts with target. Alternatively, the energy source can be internal, i.e., positioned inside the chamber.

In an ablative process, a region of the target absorbs incident energy from the energy source. This absorption and subsequent heating of the target causes target material to ablate from the surface of the target into a plume of ionic, atomic and nanometer-scale particles. The substrate material may be supported on a substrate holder or, because a laser ablation process can be carried out at atmospheric pressure, passed through the chamber on a moving substrate holder such as a conveyor belt operated continuously or discontinuously to provide a desired amount of deposited nanostructured fibrils on the substrate material.

If desired, in place of the laser, the high energy source can be an ion beam from an accelerator, ion separator or an ion gun. An ion beam may comprise inert gas ions such as neon, argon, krypton or xenon. Argon is preferred because it can provide a good sputter yield and is relatively inexpensive. The energy of the bombarding inert gas ion beam can be varied, but should be chosen to provide a sufficient sputtering yield. The ion beam can be scanned across the surface of the target material in order to improve the uniformity of target wear.

An electrical bias is applied between first and second electrode plates, which can form the upper and lower walls of the chamber. The nanostructured fibrils can be deposited directly on the lower electrode plate, which is preferably supported at a distance of from about 2 to 20 cm from the target. Alternatively, the tobacco cut filler or cigarette paper can be supported on the lower electrode plate and the nanostructured fibrils can be deposited directly on the tobacco cut filler or cigarette paper. Under the force of the electric field that forms between the two electrode plates, nanoscale particles that form from laser ablation of the target material can agglomerate together to form the nanostructured fibrils.

The introduction of reactive gases into the chamber during the ablation process allows material sputtered from the target to react and/or combine with such gases to obtain compound nanostructured fibrils. Thus, during reactive laser vaporization controlled condensation, the gas within the chamber includes a small proportion of a reactive gas, such as air, oxygen, water vapor, etc., which reacts with the atoms of the target material to form metal compound particles such as oxide nanoscale particles that can agglomerate under an applied electric field to form compound nanostructured fibrils such as nanostructured oxide fibrils. For example, nanostructured iron oxide fibrils may be deposited by ablating an iron target in the presence of an oxygen-containing gas (e.g., oxygen, air and/or water vapor).

Compound nanostructured fibrils can also be deposited via ablation of the corresponding compound (e.g., oxide) target. For example, nanostructured iron oxide fibrils may be deposited by ablating an iron oxide target.

The microstructure and composition of the nanostructured fibrils can be controlled using LVCC. Density, phase distribution and the extent and morphology of crystalline (versus amorphous) phases can be controlled by varying, for example, the deposition pressure, reactive gas flow, laser energy, substrate temperature and applied bias.

The nanostructured fibrils can comprise B, Ti, V, Cr, Fe, Co, Ni, Cu, Zn, Ge, Y, Zr, Nb, Mo, Ru, Rh, Pd, Ag, Sn, Ce, Hf, Ta, W, Re, Os, Ir, Pt, Au, as well as compounds such as oxides, oxyhydroxides and mixtures thereof. By way of example, the nanostructured fibrils can comprise metallic fibrils such as Fe or Ni fibrils; intermetallic fibrils such as FeAl, $Ti_3Al$ or NiAl fibrils; oxyhydroxide fibrils such as FeOOH or MnOOH fibrils; metal oxide fibrils such as $Fe_2O_3$, $TiO_2$, or $Cu_2O$ fibrils, or mixtures thereof.

As discussed above, the substrate is typically placed proximate to the target such that it is in the path of the ablated target atoms and the target material is deposited on the surface of the substrate.

By regulating the deposition parameters, including background gas, pressure, substrate temperature and time, it is possible to prepare tobacco cut filler and/or cigarette paper that comprise a loading and distribution of nanostructured fibrils thereon effective to reduce the amount of carbon monoxide in mainstream smoke. According to an embodiment, the nanostructured fibrils can be formed and deposited in situ on the tobacco cut filler and/or cigarette paper. In an embodiment where the nanostructured fibrils are deposited directly on tobacco cut filler and/or cigarette paper, the LVCC process is stopped when there is still exposed substrate surface. That is, the ablation method does not build up a continuous layer but rather forms nanostructured fibrils that are uniformly or non-uniformly distributed over the tobacco cut filler and/or cigarette paper surface. During the processes of formation and deposition, new fibrils form and existing fibrils can grow.

Advantageously, LVCC allows for dry, solvent-free, simultaneous formation and deposition of nanostructured fibrils directly on tobacco cut filler and/or cigarette paper under sterile conditions.

According to a further embodiment, the nanostructured fibrils can be formed by LVCC or other suitable methods and later deposited on or incorporated in the tobacco cut filler and/or cigarette paper.

In addition to LVCC, nanostructured fibrils can be formed by precipitating a metal salt under basic conditions to produce a metal oxide, which is then converted to nanostructured oxide or oxyhydroxide fibrils upon exposure to warm, moist air. An oxide (e.g., hausmanite ($Mn_3O_4$)) can be prepared via precipitation of a metal salt (e.g., manganese nitrate) using sodium hydroxide as a precipitation agent. The oxide can comprise nanoscale or larger sized particles. Individual oxide particles and/or irregularly shaped agglomerates of oxide particles can be converted to nanostructured fibrils upon exposure to warm, moist air. The rate of formation of the fibrils is a function of temperature and moisture. Preferably, the temperature to convert the oxide to nanostructured fibrils is greater than about room temperature, preferably between about 80° C. to 100° C., and the relative humidity is greater than about 65%, preferably from about 90% to 100%. Once formed, the fibrils can be combined with tobacco cut filler and/or cigarette paper, which can be incorporated into a cigarette. In an alternative embodiment, an oxide can convert to nanostructured fibrils after the oxide has been incorporated in the tobacco cut filler or cigarette paper. Oxide particles can react with moisture in the tobacco cut filler or cigarette paper to form nanostructured fibrils.

By way of example, a 0.1 M aqueous solution of sodium hydroxide was added under vigorous stirring to an aqueous solution of manganese (II) nitrate (99.98% purity) to adjust the solution pH to about 10. The solution temperature was about 65° C. The resulting slurry was aged for about 1 hour, filtered, washed with dionized water, and then dried. The dried filtrate comprised irregularly shaped agglomerates of hausmanite ($Mn_3O_4$). Fiber formation was observed by exposing the dried filtrate to oxidizing conditions. By exposing the dried filtrate to heated, humid air, the dried filtrate can restructure to a fibrous form of MnOOH. Manganese oxide can restructure to form fibrous manganese oxyhydroxide according to the following reaction pathway: $4\ Mn_3O_4 + 6H_2O + O_2 \rightarrow 12\ MnOOH$.

Figure 2:
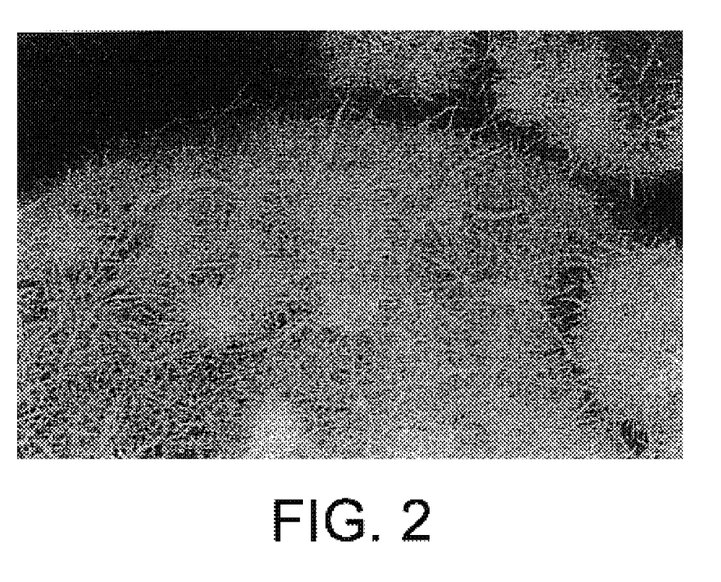
FIG. 2 shows an SEM image of nanostructured fibrils of MnOOH formed by oxidation of manganese oxide at room temperature.
Figure 3A:
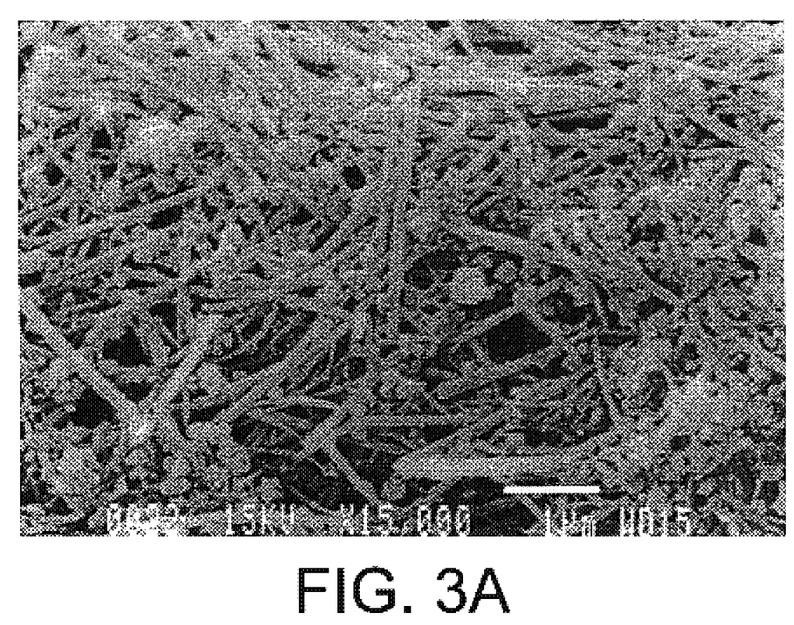
FIGS. 3A and 3B shows SEM images of nanostructured fibrils of MnOOH formed by oxidation of manganese oxide at 44° C. and 92° C., respectively.
Figure 3B:
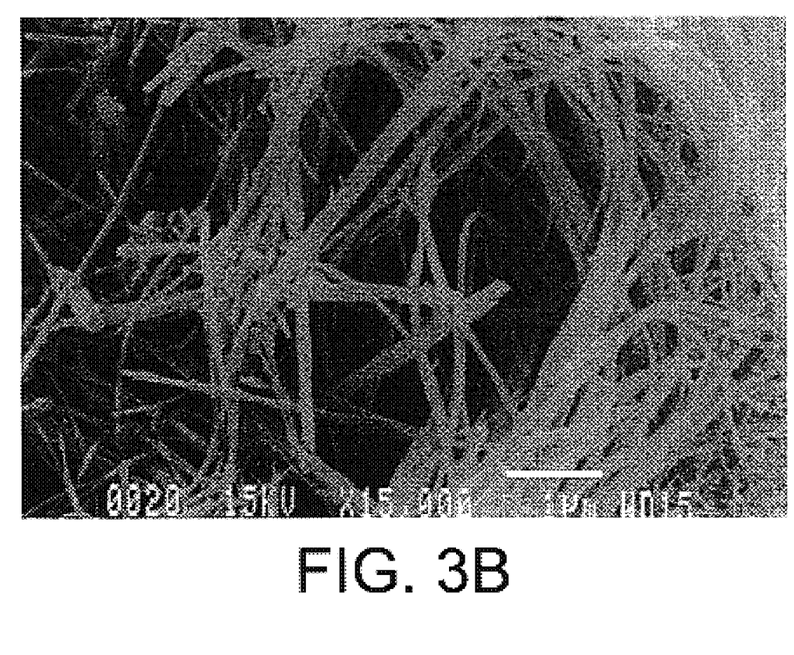

An SEM image of MnOOH fibrils formed by exposing the dried filtrate to room temperature air having 60-65% relatively humidity for 45 days is shown in FIG. 2. The rate of conversion of the dried oxide filtrate to nanostructured oxide fibrils can be increased by increasing the temperature and/or relative humidity of the oxidizing condition. An SEM image of MnOOH fibrils formed by exposing the dried filtrate to 44° C. air and 92° C. air having 60-65% relatively humidity for 2.5 days is shown in FIGS. 3A and 3B, respectively.

Preferably, the nanostructured fibrils are deposited on or incorporated in the tobacco cut filler and/or cigarette paper in an amount effective to reduce the ratio in mainstream smoke of carbon monoxide to total particulate matter (e.g., tar) by at least 10%, more preferably by at least 25%. Preferably, the nanostructured fibrils comprise less than about 10% by weight of the tobacco cut filler, more preferably less than about 5% by weight of the tobacco cut filler.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 or 5,322,075.

The term "mainstream" smoke refers to the mixture of gases passing down the tobacco rod and issuing through the filter end, i.e., the amount of smoke issuing or drawn from the mouth end of a cigarette during smoking of the cigarette.

In addition to the constituents in the tobacco, the temperature and the oxygen concentration are factors affecting the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$ are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the nanostructured fibrils can target the various reactions that occur in different regions of the cigarette during smoking.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. Because oxygen is being consumed in the combustion of tobacco to produce carbon monoxide, carbon dioxide, water vapor and various organic compounds, the concentration of oxygen is low in the combustion zone. The low oxygen concentrations coupled with the high temperature leads to the reduction of carbon dioxide to carbon monoxide by the carbonized tobacco. In this region, the nanostructured fibrils can convert carbon monoxide to carbon dioxide via both catalysis and oxidation mechanism. The combustion zone is highly exothermic and the heat generated is carried to the pyrolysis/distillation zone.

The pyrolysis zone is the region behind the combustion zone, where the temperatures range from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, smoke components and charcoal using the heat generated in the combustion zone. There is some oxygen present in this region, and thus the nanostructured fibrils may act as a catalyst for the oxidation of carbon monoxide to carbon dioxide. The catalytic reaction begins at 150° C. and reaches maximum activity around 300° C.

In the condensation/filtration zone the temperature ranges from ambient to about 150° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level.

According to a preferred method, the nanostructured fibrils are formed in situ by ablation and are deposited directly on tobacco cut filler and/or cigarette paper. According to a further embodiment, the nanostructured fibrils can be deposited on the tobacco cut filler and/or cigarette paper used to form a cigarette.

The nanostructured fibrils are a class of materials whose distinguishing feature is that their average diameter, or other structural domain size is below about 500 nanometers. The nanostructured fibrils can have an average constituent particle size less than about 100 nm, preferably less than about 50 nm, more preferably less than about 10 nm, and most preferably less than about 7 nm. At this small scale, a variety of confinement effects can significantly change the properties of the material that, in turn, can lead to commercially useful characteristics. For example, nanostructured fibrils have very high surface area to volume ratios, which makes them attractive for catalytic applications.

During the conversion of CO to $CO_2$, the nanostructured fibrils may become reduced. For example, nanostructured fibrils of $Fe_2O_3$ may be reduced to FeO or Fe during the reaction of CO to $CO_2$.

Iron oxide is a preferred constituent in the nanostructured fibrils because it has a dual function as a CO catalyst in the presence of oxygen and as a CO oxidant for the direct oxidation of CO in the absence of oxygen. A catalyst that can also be used as an oxidant is especially useful for certain applications, such as within a burning cigarette where the partial pressure of oxygen can be very low.

The nanostructured fibrils will preferably be distributed throughout the tobacco rod of a cigarette. By providing the nanostructured fibrils throughout the tobacco rod, it is possible to reduce the amount of carbon monoxide drawn through the cigarette, and particularly at both the combustion region and in the pyrolysis zone.

The nanostructured fibrils, as described above, may be provided along the length of a tobacco rod or at discrete locations along the length of a tobacco rod. For example, the nanostructured fibrils can be deposited on loose cut filler tobacco stock or deposited directly on a tobacco column prior to wrapping cigarette paper around the cigarette column.

The amount of the nanostructured fibrils can be selected such that the amount of carbon monoxide in mainstream smoke is reduced during smoking of a cigarette. Preferably, the amount of the nanostructured fibrils will be a catalytically effective amount, e.g., an amount sufficient to oxidize and/or catalyze at least 10% of the carbon monoxide in mainstream smoke, more preferably at least 25%.

One embodiment provides tobacco cut filler comprising nanostructured fibrils wherein the nanostructured fibrils are formed and deposited directly on the tobacco cut filler by laser ablation under an applied electric field.

Any suitable tobacco mixture may be used for the cut filler. Examples of suitable types of tobacco materials include flue-cured, Burley, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g. burn additives, combustion modifying agents, coloring agents, binders, etc.) known in the art.

Another embodiment provides a cigarette comprising tobacco cut filler and cigarette paper, wherein at least one of the cut filler and the cigarette paper comprises nanostructured fibrils. A further embodiment provides a method of making a cigarette comprising (i) depositing nanostructured fibrils on at least one of tobacco cut filler and cigarette paper; (ii) providing the tobacco cut filler to a cigarette making machine to form a tobacco column; and (iii) placing the cigarette paper around the tobacco column to form a tobacco rod of a cigarette. The nanostructured fibrils can be deposited on or incorporated in tobacco cut filler and cigarette paper during the process of forming the nanostructured fibril. According to a further embodiment, the nanostructured fibrils can be formed and then deposited on or incorporated in tobacco cut filler and cigarette paper using techniques such as dusting or dry-mixing.

Techniques for cigarette manufacture are known in the art. Any conventional or modified cigarette making technique may be used to incorporate the nanostructured fibrils. The resulting cigarettes can be manufactured to any known specifications using standard or modified cigarette making techniques and equipment. Typically, the cut filler composition is optionally combined with other cigarette additives, and provided to a cigarette making machine to produce a tobacco column, which is then wrapped in cigarette paper, and optionally tipped with filters.

Cigarettes may range from about 50 mm to about 120 mm in length. The circumference is from about 15 mm to about 30 mm in circumference, and preferably around 25 mm. The tobacco packing density is typically between the range of about 100 mg/cm$^3$ to about 300 mg/cm$^3$, and preferably 150 mg/cm$^3$ to about 275 mg/cm$^3$.

While various embodiments have been described, it is to be understood that variations and modifications may be resorted to as will be apparent to those skilled in the art. Such variations and modifications are to be considered within the purview and scope of the claims appended hereto.

All of the above-mentioned references are herein incorporated by reference in their entirety to the same extent as if each individual reference was specifically and individually indicated to be incorporated herein by reference in its entirety.

What is claimed is:

1. A method for forming nanostructured fibrils directly on a component of a cigarette comprising:
   supporting a target in a chamber having first and second electrodes;
   applying an electrical bias between the first and second electrodes to form electrical field lines between the electrodes;
   supporting the cigarette component on the first electrode, and
   bombarding the target with energetic ions to form nanoscale particles from the target material that agglomerate with each other along the direction of the electrical field lines to form nanostructured fibrils on the cigarette component.

2. The method of claim 1, comprising forming the nanostructured fibrils on a cigarette component selected from the group consisting of tobacco cut filler and cigarette paper.

3. The method of claim 1, further comprising supporting the first electrode parallel to the second electrode.

4. The method of claim 1, further comprising maintaining the first and second electrodes at a temperature during the bombardment of from about −196C. to 100C.

5. The method of claim 1, further comprising maintaining a temperature gradient of greater than about 100C. between the first and second electrodes.

6. The method of claim 1, comprising supporting the first electrode at a distance of from about 2 to 20 cm from the target.

7. The method of claim 1, comprising applying a bias of less than about 100 V/cm.

8. The method of claim 1, wherein the chamber is a vacuum chamber.

9. The method of claim 1, comprising bombarding the target in an inert atmosphere or an atmosphere comprising a reactive gas.

10. The method of claim 1, comprising bombarding the target in an atmosphere comprising an oxygen-containing gas.

11. The method of claim 1, comprising bombarding the target in an atmosphere comprising a gas selected from the group consisting of air, oxygen and water vapor.

12. The method of claim 1, comprising bombarding the target at a chamber pressure of greater than about 1×10−4 Torr.

13. The method of claim 1, comprising bombarding the target at a chamber pressure of about atmospheric pressure.

14. The method of claim 1, comprising bombarding the target with a Nd-YAG laser, ion laser, diode array laser or pulsed excimer laser.

15. The method of claim 1, wherein the target comprises manganese, iron and/or copper.

16. The method of claim 1, comprising forming nanostructured fibrils having a width of less than about 500 nm.

17. The method of claim 1, comprising forming nanostructured fibrils having a width of less than about 100 nm.

18. The method of claim 1, comprising forming nanostructured fibrils having a width of less than about 50 nm.

19. The method of claim 1, comprising forming nanostructured fibrils having an aspect ratio of length to width of greater than about 10:1.

20. The method of claim 1, comprising forming nanostructured fibrils having an aspect ratio of length to width of greater than about 1,000:1.

21. The method of claim 1, comprising forming nanostructured fibrils having an aspect ratio of length to width of greater than about 1,000,000:1.

22. The method of claim 1, comprising forming nanostructured fibrils comprising manganese, iron and copper, oxides and/or oxyhydroxides of manganese, iron and copper, and mixtures thereof.

23. The method of claim 1, comprising forming nanostructured fibrils having a crystalline structure.

24. The method of claim 1, wherein the nanostructured fibrils are capable of acting as an oxidant for the conversion of carbon monoxide to carbon dioxide and/or as a catalyst for the conversion of carbon monoxide to carbon dioxide.

* * * * *